United States Patent [19]

Weiss

[11] Patent Number: 5,553,516

[45] Date of Patent: Sep. 10, 1996

[54] AUTOMATIC PEDAL

[76] Inventor: Jonathan Weiss, 3675 Clarington Ave. #1, Los Angeles, Calif. 90034

[*] Notice: The term of this patent shall not extend beyond the expiration date of Pat. No. 5,284,066.

[21] Appl. No.: 192,261

[22] Filed: Feb. 7, 1994

Related U.S. Application Data

[63] Continuation-in-part of Ser. No. 696,303, Apr. 29, 1991, Pat. No. 5,284,066.

[51] Int. Cl.$^6$ ........................................... G05G 1/14
[52] U.S. Cl. .................. 74/594.6; 74/594.4; 36/131
[58] Field of Search .............................. 74/594.4, 594.6; 36/131, 132

[56] References Cited

U.S. PATENT DOCUMENTS

| | | | |
|---|---|---|---|
| 4,298,210 | 11/1981 | Lotteau et al. | 74/594.6 |
| 4,942,778 | 7/1990 | Bryne | 74/594.6 |
| 5,007,185 | 4/1991 | Lazarski | 36/131 X |
| 5,079,968 | 1/1992 | Starner | 74/594.6 |
| 5,213,009 | 5/1993 | Bryne | 74/594.6 |
| 5,251,508 | 10/1993 | Robbins | 74/594.4 X |
| 5,269,200 | 12/1993 | Hawkins | 36/131 |
| 5,325,738 | 7/1994 | Bryne | 74/594.6 |
| 5,381,708 | 1/1995 | Liao | 74/594.4 |

FOREIGN PATENT DOCUMENTS

657886  9/1951  United Kingdom ................. 74/594.4

*Primary Examiner*—Vinh T. Luong

[57] ABSTRACT

An automatic pedal is composed of a bracket member adapted to be supported by the pedal arm of a conventional bicycle, and a peg member adapted to be supported by a conventional riding shoe. The bracket member has an aperture configured to receive the peg member and to secure the peg member to the bracket when the bicycle rider places the riding shoe in a riding position. The aperture is configured to release the peg member upon the riding shoe being turned out of the riding position. The peg member is provided with two mating portions which allow the riding position (the position at which the peg member is secured to the riding shoe) to be adjusted.

6 Claims, 12 Drawing Sheets

AUTOMATIC PEDAL

This is a continuation-in-part of application Ser. No. 07/696,303, filed on Apr. 29, 1991 now U.S. Pat. No. 5,284,066 issued on Feb. 8, 1994.

BACKGROUND OF THE INVENTION

1. Field of the Invention

The present invention is directed to an improvement of an automatic pedal device for attaching a bicycle rider's shoes to the pedal mechanism of a bicycle or other cycle-type device.

2. Description of Related Art

Bicycle rider's have found it advantageous to secure their shoes to the pedals of a bicycle so as to provide means for applying a lifting force, as well as a pushing force, to the pedals. Thus, while one pedal is being pushed downward by one of the rider's legs, the other pedal is lifted upwards by the other of the rider's legs.

It is an object of the present invention to provide an improved automatic pedal device wherein a bicycle rider can quickly and easily secure his shoes to the bicycle pedal mechanism without the use of his hands.

It is also an object of the present invention to provide an improved automatic pedal device wherein a bicycle rider can quickly and easily release his shoes from the bicycle pedal mechanism without the use of his hands.

It is also an object of one embodiment of the present invention to provide an improved automatic pedal device which can be attached to conventional bicycle pedals and conventional riding shoes without substantial modification of either of the pedals or the shoes.

The foregoing and other objects, advantages, and features of the invention as well as presently preferred embodiments thereof will become more apparent from the following description in connection with the accompanying drawings.

SUMMARY OF THE INVENTION

The present invention is directed to an automatic pedal which provides means for quickly and easily securing and releasing a bicycle rider's shoes to bicycle pedal mechanism. In the preferred embodiments, a peg secured to each shoe is releasably attachable to a bracket connected to each of the pedal arms. In one embodiment, the connection of each bracket to a pedal arm comprises a connection of each bracket to a respective bicycle pedal and a connection of each bicycle pedal to a respective bicycle pedal arm. In this embodiment, the bracket may be secured to a conventional bicycle pedal by using screws and screw holes normally provided on conventional pedals for mounting reflectors, or the like, thereon. In other embodiments, the bracket may be connected directly (or through a bearing mechanism) to the pedal arm or formed as part of the pedal arm. In each of these embodiments, each bracket is secured to a respective pedal arm so as to substantially preclude upward vertical movement of the bracket with respect to the pedal axis.

In one embodiment, the peg is adapted to be secured to the bottom of a conventional riding shoe by using the screw holes and screws normally provided on conventional riding shoes for mounting a cleat, or the like, thereon. In other embodiments, the peg may be secured to a riding shoe by other means or may be formed as part of the riding shoe.

DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention.

The following descriptions pertain to embodiments of the present invention as they relate to a single shoe and a single bicycle pedal. The descriptions however are intended to relate to both shoes and both pedals, since they operate in the same manner. While the term "bicycle" is used in the description of embodiments of the invention, the term is not to be considered as limiting the invention to two-wheeled cycles. Rather, embodiments of the invention may be applied to any cycle or other mechanism requiring foot operated pedals.

Preferred embodiments of the invention are directed to devices and methods for quickly and easily securing and releasing a bicycle rider's shoes to a bicycle pedal mechanism. Bicycle pedal mechanisms 50 typically include a pedal sprocket 52 and a pair of pedal arms 54 extending from the sprocket axis S to a pedal axis P. Some pedal mechanisms include conventional pedals coupled to the pedal arms at the pedal axis (typically through a bearing mechanism to allow rotation motion of the pedal about the pedal axis).

In the preferred embodiments, a peg secured to each shoe is releasably attachable to a bracket connected to each of the pedal arms. In other embodiments the peg may be secured to the pedal mechanism and the bracket secured to the shoe. However, for purposes of simplifying the application, the embodiments shown in the drawings and described herein are of the former type.

In one embodiment, the connection of each bracket to a pedal arm comprises a connection of each bracket to a respective bicycle pedal and a connection of each bicycle pedal to a respective bicycle pedal arm. In this embodiment, the bracket may be secured to a conventional bicycle pedal by using screws and screw holes normally provided on conventional pedals for mounting reflectors, or the like, thereon. In other embodiments, the bracket may be connected directly (or through a bearing mechanism) to the pedal arm or formed as part of the pedal arm. In each of these embodiments, each bracket is secured to a respective pedal arm so as to substantially preclude upward vertical movement of the bracket with respect to the pedal axis.

Figure 1:
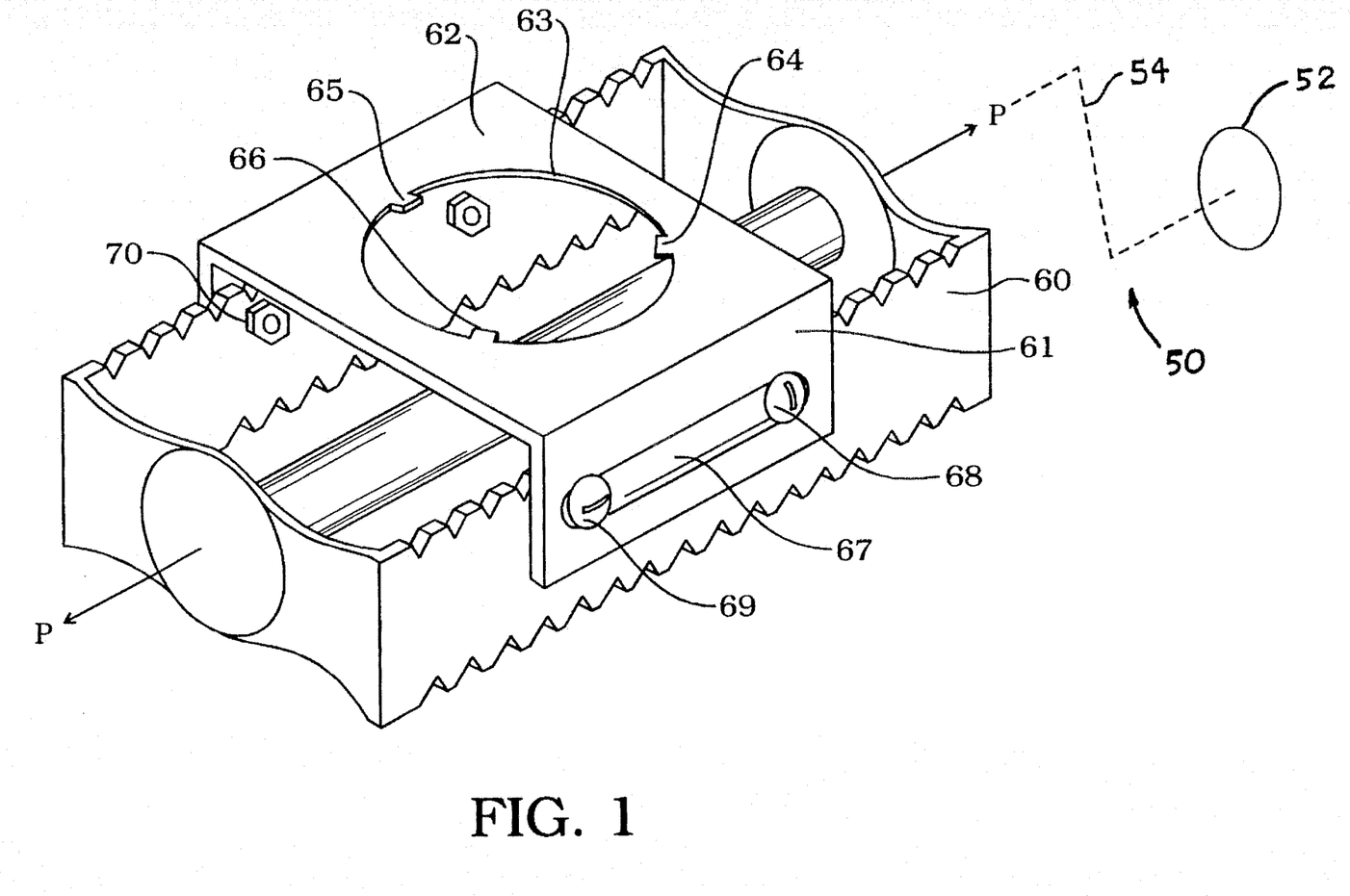
FIG. 1 shows an embodiment of a bracket attached to a conventional bicycle pedal.

FIGS. 1–4 show one embodiment of the present invention. As shown in FIG. 1, a bracket 62 is configured to fit over a conventional bicycle pedal 60. The bracket 62 is secured to the pedal by suitable means such as screws 68 and 69 and nuts 70, so as to substantially preclude upward vertical movement of the bracket 62 relative to the pedal axis P. An elongated hole 67 located in the sides 61 of the bracket aligns with screw holes normally formed in conventional pedals for mounting reflectors (not shown). The elongated shape of the hole 67 ensures that such alignment will occur when the bracket 62 is placed on a conventional pedal 60. The elongated shape of the hole 67 also allows positioning of the bracket 62 at the rider's preferred position along the pedal axis P. In other embodiments, the bracket 62 may be secured to the pedal mechanism (so as to substantially preclude upward vertical movement of the bracket with respect to the pedal axis P), by connecting the bracket to the pedal arm (directly or through a bearing mechanism) or by forming the bracket as part of the pedal arm.

In the embodiment shown in FIGS. 1–4, circular hole 63 is located in the top of the bracket. Three (but not limited to three) tabs 64, 65 and 66 extend from the edge of the hole 63 towards the center of the hole and are adapted to engage, in a screw thread manner, with spiral slots (FIG. 2 (74)) formed on a cylindrical peg secured to a shoe.

Figure 2:
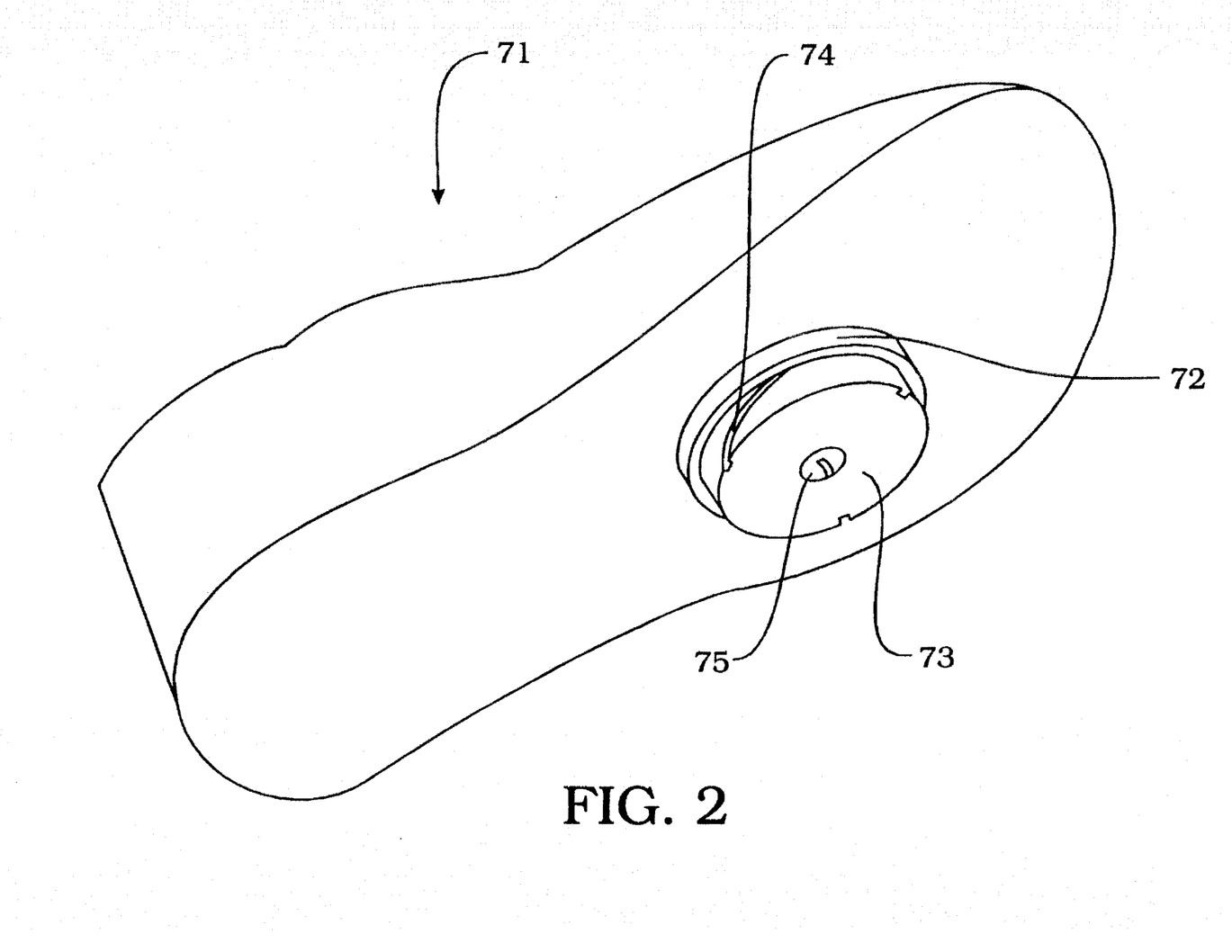
FIG. 2 shows an embodiment of a peg attached to a shoe.
Figure 3:
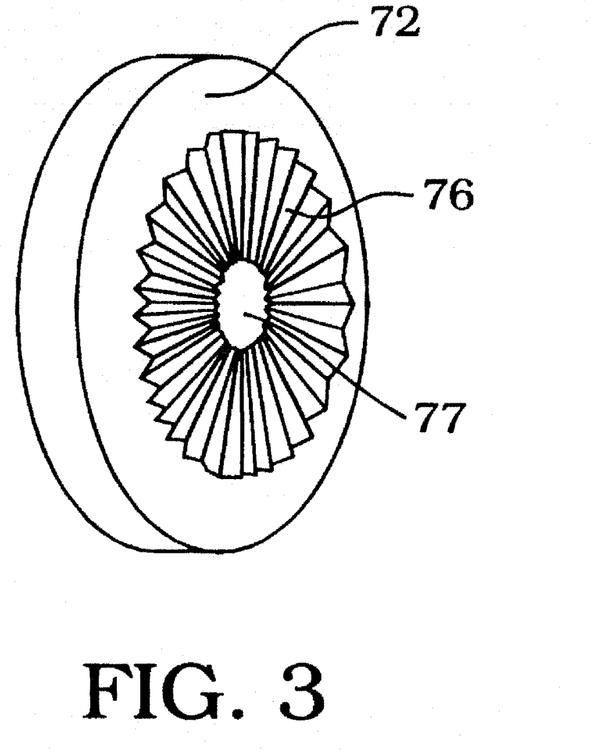
FIG. 3 shows an embodiment of the base of the peg.
Figure 4:
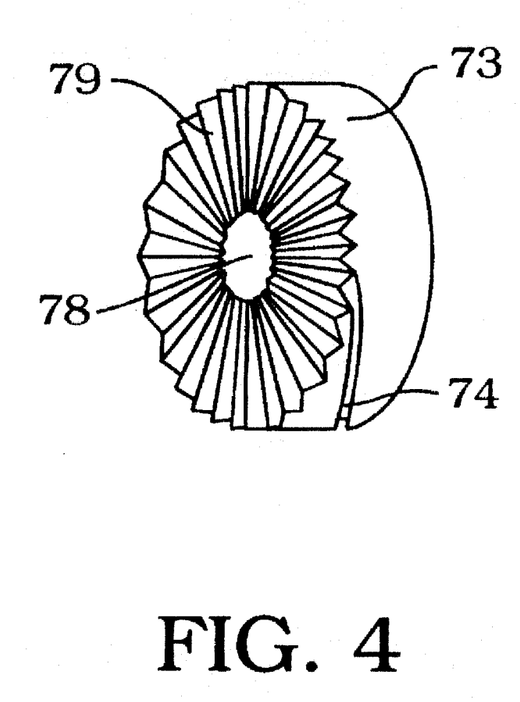
FIG. 4 shows an embodiment of the peg in FIG. 2 without the base.
Figure 8:
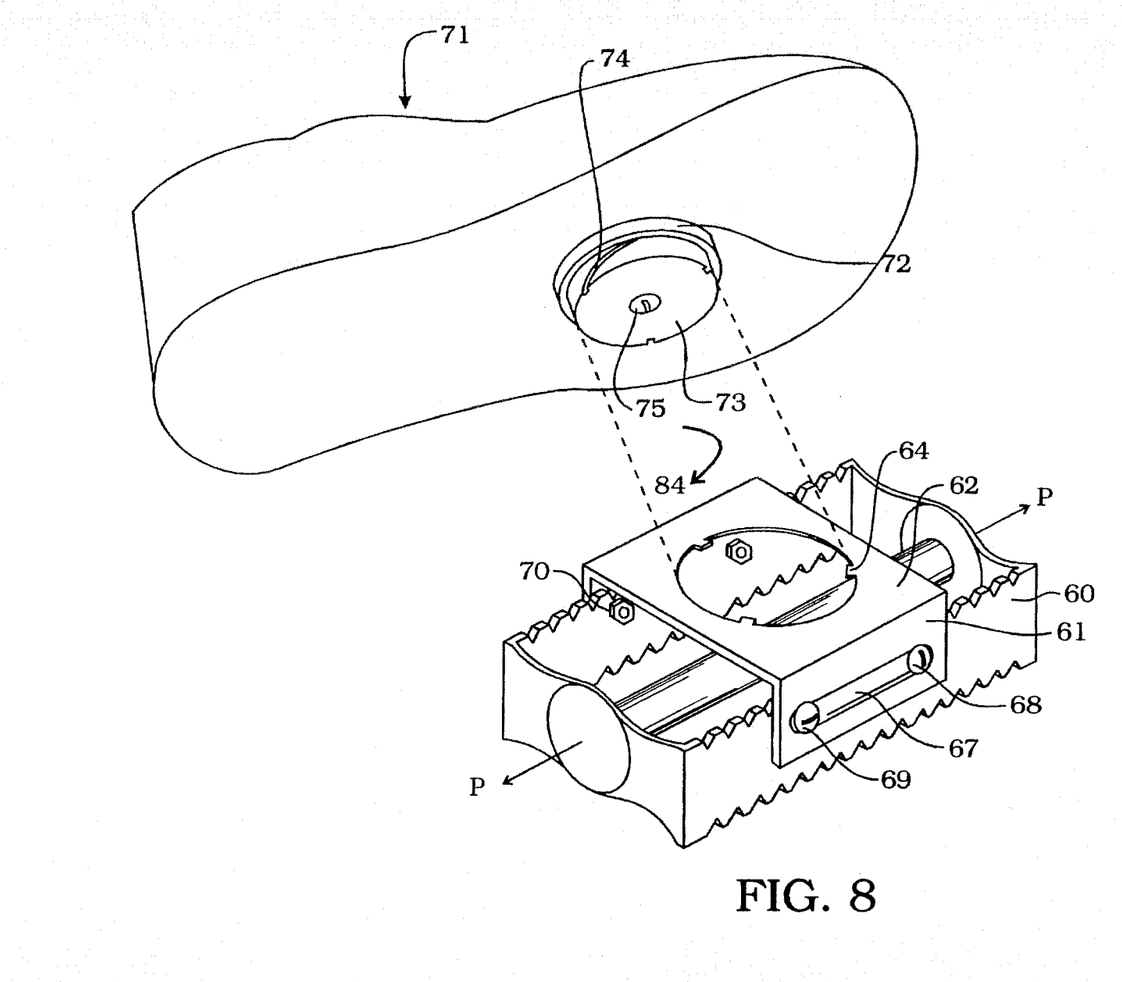
FIG. 8 shows a shoe being secured to a pedal with apparatus according to the embodiment in FIGS. 1 and 2.
Figure 9:
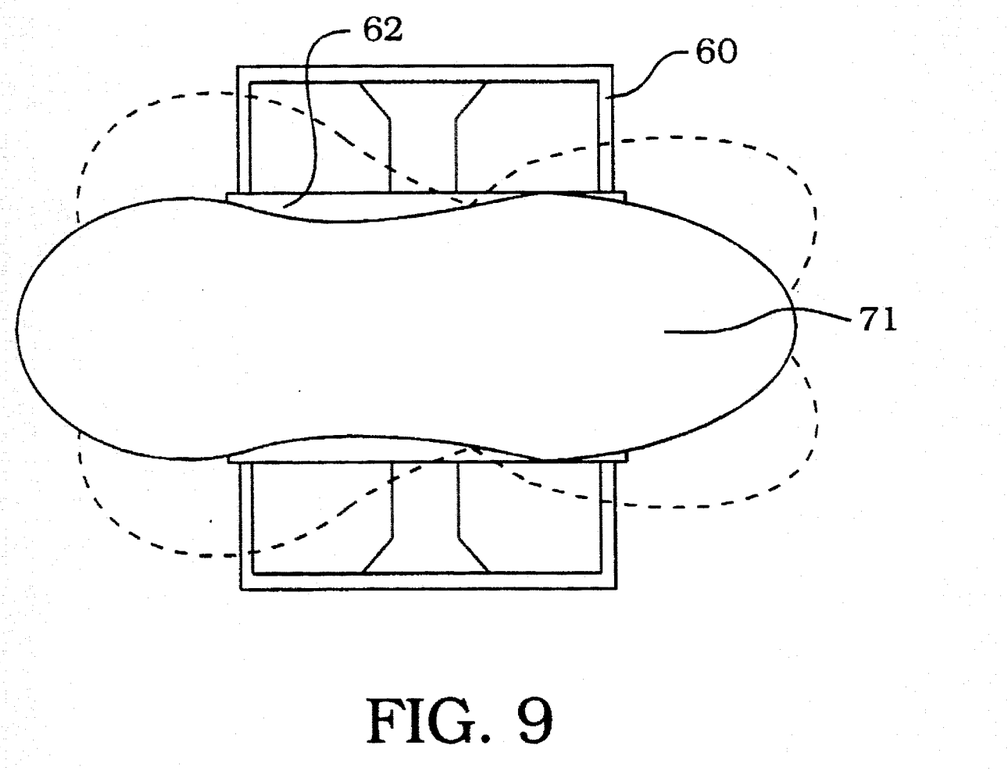
FIG. 9 shows a shoe secured to a pedal in various riding positions.

FIG. 2 shows a shoe 71 having the aforementioned peg 73 secured to the sole. The peg 73 extends outward from the sole of a shoe 71 and is secured thereto by suitable means, such as a screw 75. The screw hole (FIG. 4 (78)) may be positioned so as to align with holes normally provided in conventional riding shoes for mounting a cleat (not shown) thereon. Slots (releasable attaching means) 74, being spiral shaped, are formed on the peg 73 and are adapted to align with the tabs 64, 65, and 66 on the bracket 62. By aligning the slots 74 with the tabs 64, 65 and 66, and twisting the shoe in one direction, approximately 45 degrees, the tabs are guided in the slots, in a screw threading manner, so as to secure the peg 73 to the bracket 62 providing a means for releasably attaching the peg 73 to the bracket 62. This motion to secure the peg 73 to the bracket 62 is shown in FIG. 8 with arrow 84. FIG. 9 shows the position of the shoe with respect to the pedal 60 upon the peg 73 being secured with the bracket 62. In this manner, a bicycle rider can quickly and easily secure his shoe to the pedal of his bicycle. By twisting his shoe in the other direction (opposite to arrow 84), the tabs 64, 65 and 66 are guided out of the slots 74 and the peg 73 is released from the bracket 62. In this manner, a bicycle rider can quickly and easily release his shoe 71 from the bicycle pedal 60, even while the bicycle is in motion.

Each slot 74 shown in FIG. 2 begins at the bottom of peg 73 and ascend upward and partially around the peg, forming a partial spiral. The slots 74 can be formed so as to ascend upward and clockwise around the peg or upward and counterclockwise. It has been found that best results are obtained if the slots on the peg attached to the right shoe ascend upward and clockwise, while the slots formed on the peg attached to the left shoe ascend upward and counterclockwise. The twisting action of each foot will, thereby, be directed from a shoe position with the toe turned slightly inward toward the bicycle to a normal riding position, in order to secure the shoe to the pedal. The twisting action of each foot, from a normal riding shoe position, to a shoe position with the toes directed slightly inward will, thereby, effect the release of the shoe from the pedal.

In the preferred embodiment, peg 73 includes a base 72 having a slightly larger radius. Preferably, the base 72 is formed as a separate piece with respect to peg 73 such that the base 72 and the peg 73 can be considered first and second separable bodies (see FIGS. 3 and 4). An annular array of ridges and grooves 76 formed on the base 72 is adapted to engage with a similar annular array 79 formed on the peg 73. The base 72 may also include an outwardly extending tab (not shown), extending from the opposite side than that of the annular array 79, for engaging with an inwardly directed notch (not shown) in the sole of the shoe. When engaged, the aforementioned tab and notch will prohibit rotation of the base and the peg about the screw 75.

The base 72 and the peg 73 each include at least one hole 77 and 78 through which at least one screw 75 is inserted for attaching the base and the peg onto a shoe 71. In other embodiments, the peg may attach to the shoe 71 by other suitable connecting means. When engaged, the annular arrays of ridges and grooves 76 and 79 prohibit the peg 73 from rotating about the screw 75. The annular arrays of ridges and grooves 76 and 79 also allow a rider to position the threads 74, with respect to the base 72 and the shoe 71, such that the rider's preferred toe position (e.g., such as shown in solid lines in FIG. 9) will be achieved when the peg 73 is secured to the bracket 62. Thus, if a rider prefers to ride with his toes directed slightly inward or slightly outward, the peg 73 can be fitted with the base 72 so that the rider's shoe assumes the preferred direction (e.g., such as shown in broken lines in FIG. 9) when the peg 73 and the shoe are secured to the bracket 62 and the pedal 60.

Figure 5:
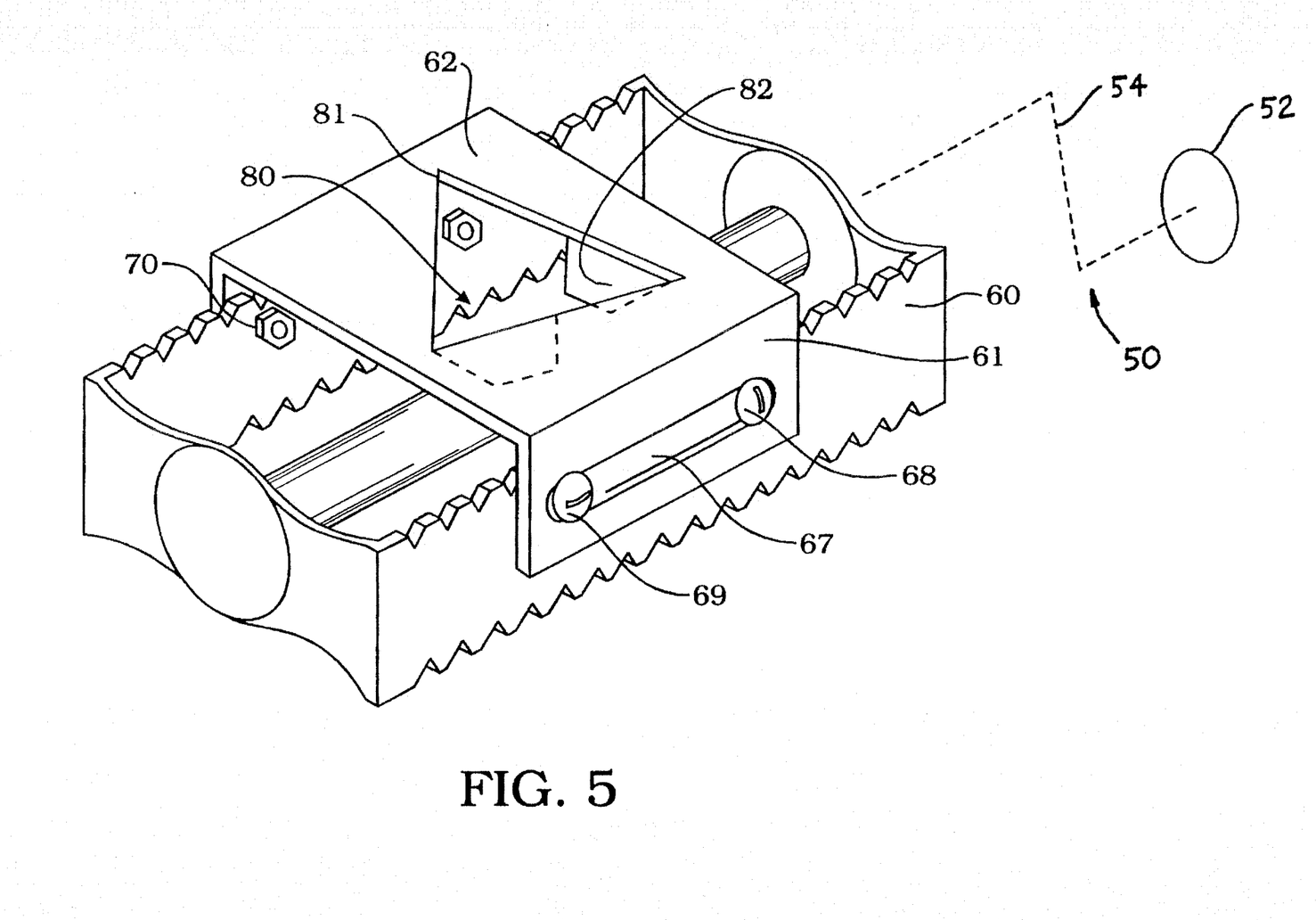
FIG. 5 shows another embodiment of a bracket attached to a conventional bicycle pedal.
Figure 6:
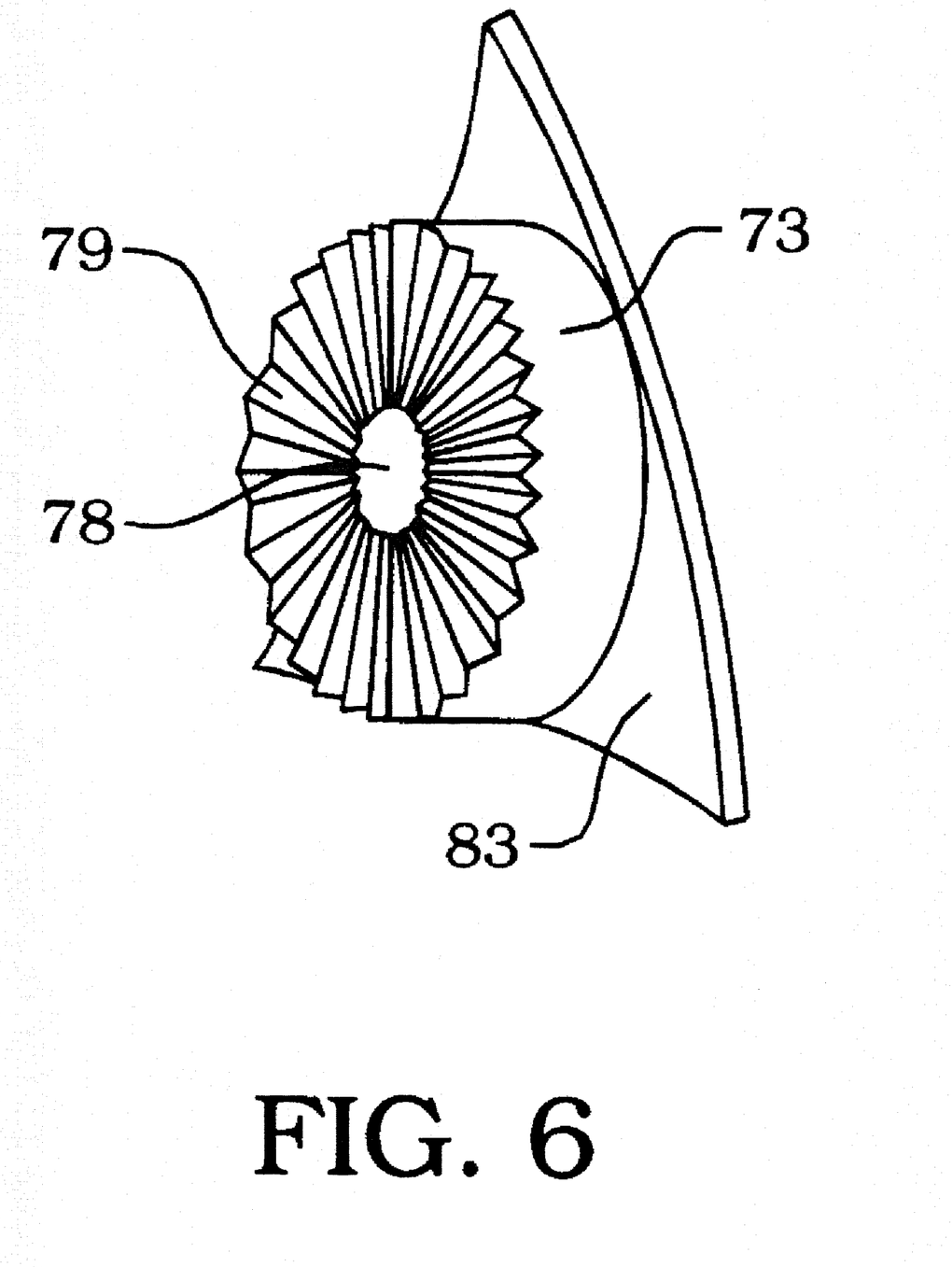
FIG. 6 shows another embodiment of the peg without the base.
Figure 7:
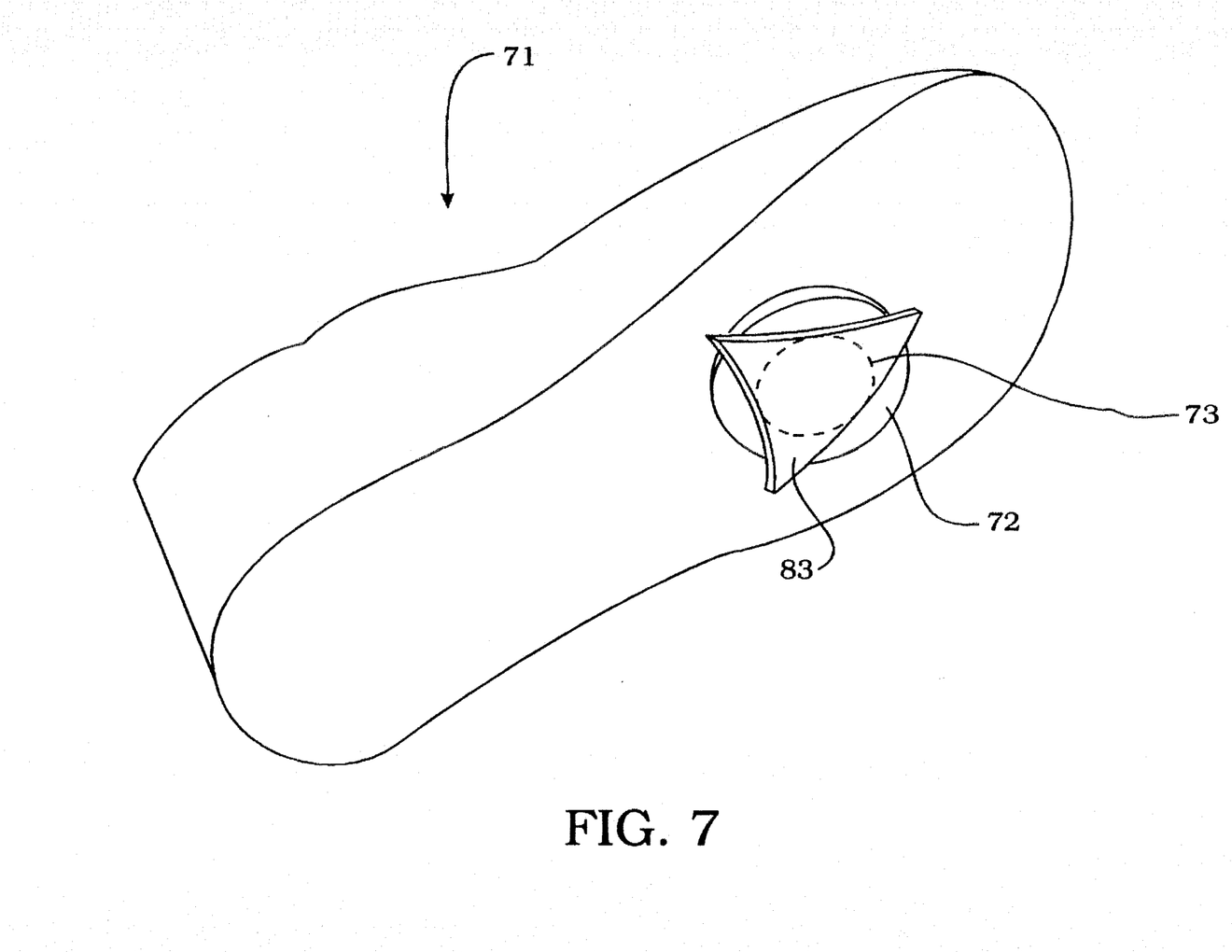
FIG. 7 shows the embodiment of the peg in FIG. 6 attached to a shoe.
Figure 10:
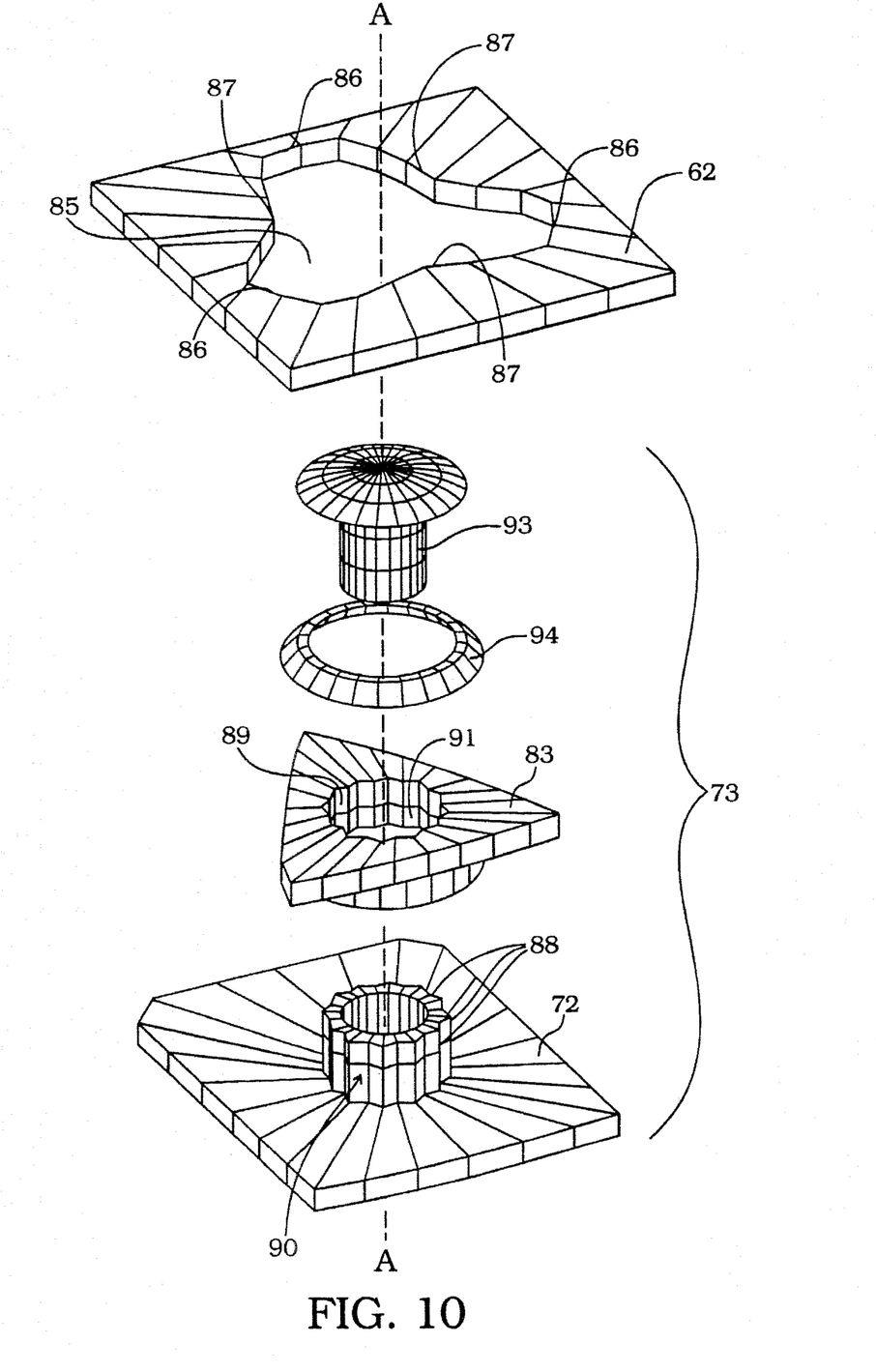
FIG. 10 shows an exploded view of another embodiment of a peg and bracket.

FIGS. 5–7 show another embodiment of the present invention. In this embodiment, the bracket 62 has a triangular hole (aperture) 80 formed in the top thereof. Other shapes can be employed, including a modified triangular shape as shown in FIG. 10 or other polygonal shapes.

The peg 73, shown in FIG. 6, has attached thereto a triangular member (releasable attaching means) 83. Other polygonal shapes may by used for member 83, depending upon the shape of the hole 80. On the side of peg 73, opposite to the side where the triangular member 83 is attached, is formed the annular array of ridges and grooves 79 as previously described. FIG. 7 shows the peg 73, the triangular member 83 and the base 72 secured to the sole of a shoe 71.

By inserting the triangular member 83 into the triangular hole 80 and rotating the foot in one direction, the corners of the triangular member will slide along the bottom of the bracket 62 and come to rest against stops 82 providing a means for releasably attaching the peg 73 to the bracket 62. The triangular member 83 is bowed so that the corners of the triangle press against the bottom of the bracket 62. The peg 73 is sized so as to tangentially contact each of the three edges of the triangular hole 80 when the triangular member 83 is inserted in the hole 80. In this manner, the peg 73 can be secured to the bracket 62 in a tight fitting manner, thereby preventing vibrational movement between the peg 73 and the bracket 62.

Thus, a rider may secure his shoes to the bicycle pedals by inserting the peg 73 and the triangular member 83 into the hole 80 and turning his feet in one direction. The triangular member 83 will abut the stops 82 when the rider's foot is turned to the rider's preferred riding position. The rider may adjust the preferred riding position of his foot by adjusting the position of the triangular member 83 with respect to the shoe 71. This is achieved by adjusting the position of peg 73 with respect to the base 72 prior to engagement of the annular array 79 with annular array 76. Once engaged, the annular arrays 79 and 76 prohibit movement of the peg 73 with respect to the base 72.

The rider may release his shoes from the pedals by merely turning his feet in the other direction, to the point where the triangular member 83 aligns with the hole 80, and lifting his feet off of the pedals. Thus, the rider can quickly and easily release his shoes from the pedals without the use of his hands.

Another embodiment of the invention is shown in FIG. 10. In FIG. 10, the bracket 62 has a hole (aperture) 85 having a modified triangular configuration, with three large radius portions 86 and three small radius portions 87. The large radius portions 86 extend a large radial distance from the center C of the hole 85 relative to the small radius portions 87. The dimensions of the hole 85 allow the triangular member 83 to pass through the hole when the tips of the triangle defined by the triangular member align with the large radius portions 86 and inhibit the triangular member to pass through the hole when the tips of the triangle defined by the triangular member align with the small radius portions 87 to provide a means for releasably attaching the peg 73 to the bracket 62.

The peg 73 in FIG. 10 includes a base 72 provided with an array of ridges and grooves 88 and a triangular member (releasable attaching means) 83 with an array of ridges and grooves 89 which form first and second bodies that cooperate with each other in a manner similar to that discussed above with respect to the arrays of ridges and grooves 76 and 79. However, the array 88 is provided on the outer surface of an upward extending portion 90 of the base 72, and array 89 is provided on the inner surface of a hole 91 through the center of the triangular member 83. The hole 91 is large enough to receive the upward extending member 90 such that the array of ridges and grooves 89 engage and mesh with the array of ridges and grooves 88. This allows the rider to adjust the riding position as discussed above with respect to arrays 76 and 79. However, the orientation of the ridges and grooves in the arrays 88 and 89 (i.e., parallel to the lengthwise axis A of the peg 73), allows the triangular member 83 to slide relative to the upward extending member 90 of the base 72, along the lengthwise axis of the peg 73 in the directions of arrow 92. In further embodiments, the extended member 90 (having grooves and ridges 88 on the outer peripheral surface) may be provided on the triangular member 83 and the hole 91 (having grooves and ridges on its inner peripheral surface) may be provided in the base 72.

A screw 93 or other connector couples the triangular member 83 to the base 72 (or directly to the shoe, through the base 72). A spring washer 94 is arranged between the head of the screw 93 and the triangular member 83, to urge the triangular member toward the base 72. The dimensions of the triangular member, peg base and bracket are chosen so that, once the triangular member has passed through the hole 85 and rotated relative to the bracket 62, the triangular member 83 is pressed against the bracket 62 by the spring force of the washer 94 acting in the direction of allowed sliding movement between the triangular member 83 and the base 72. As a result, the tips of the triangle will press against the bracket 62 by the force of the spring washer 94. This will increase ability of the rider to feel the peg locking to the bracket and will increase the stability of the device in the locked position (with the peg attached to the bracket).

Figure 11:
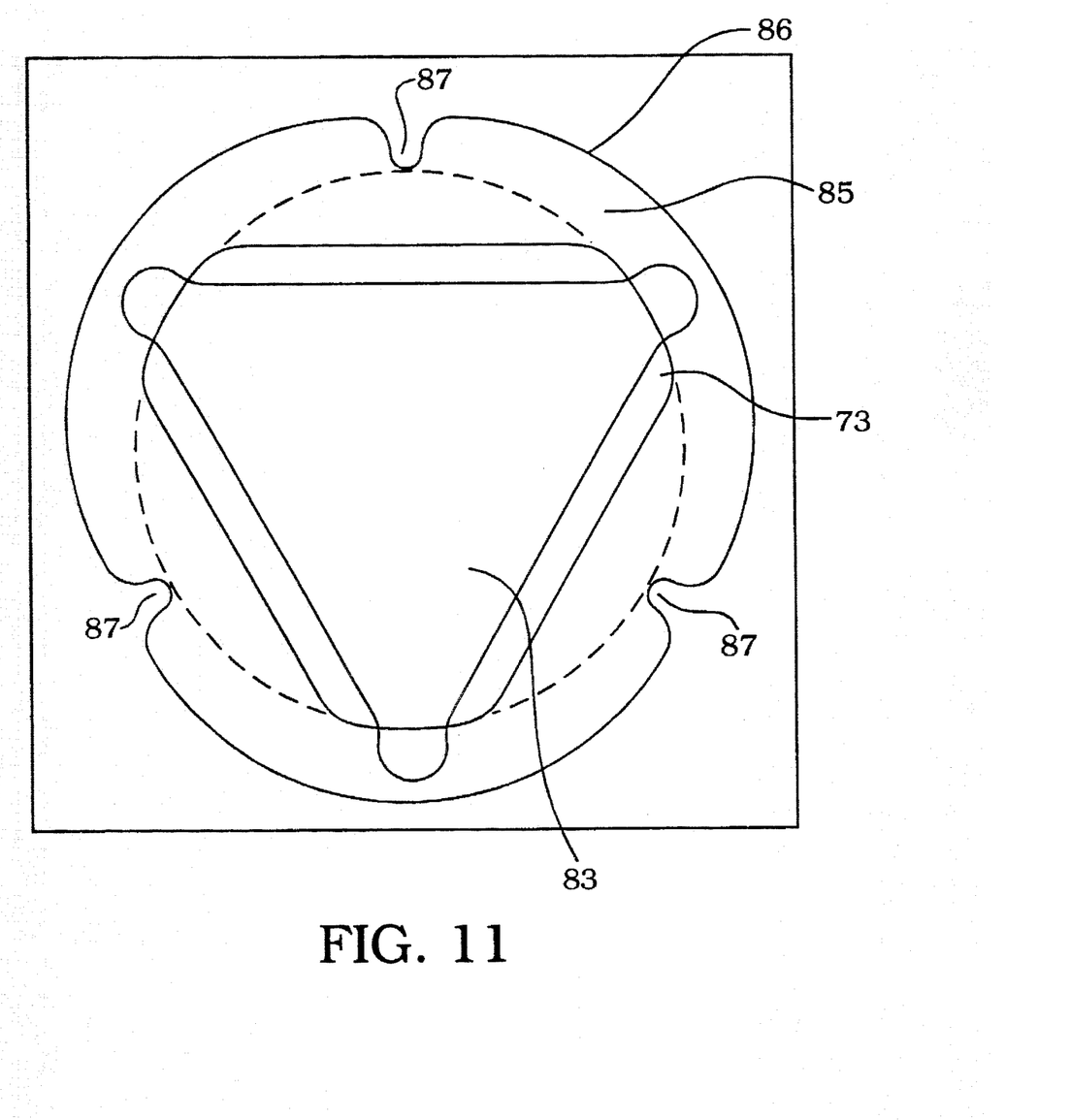
FIG. 11 shows an axial view of a peg and bracket, with the peg positioned to pass a triangular member through the bracket hole.
Figure 12:
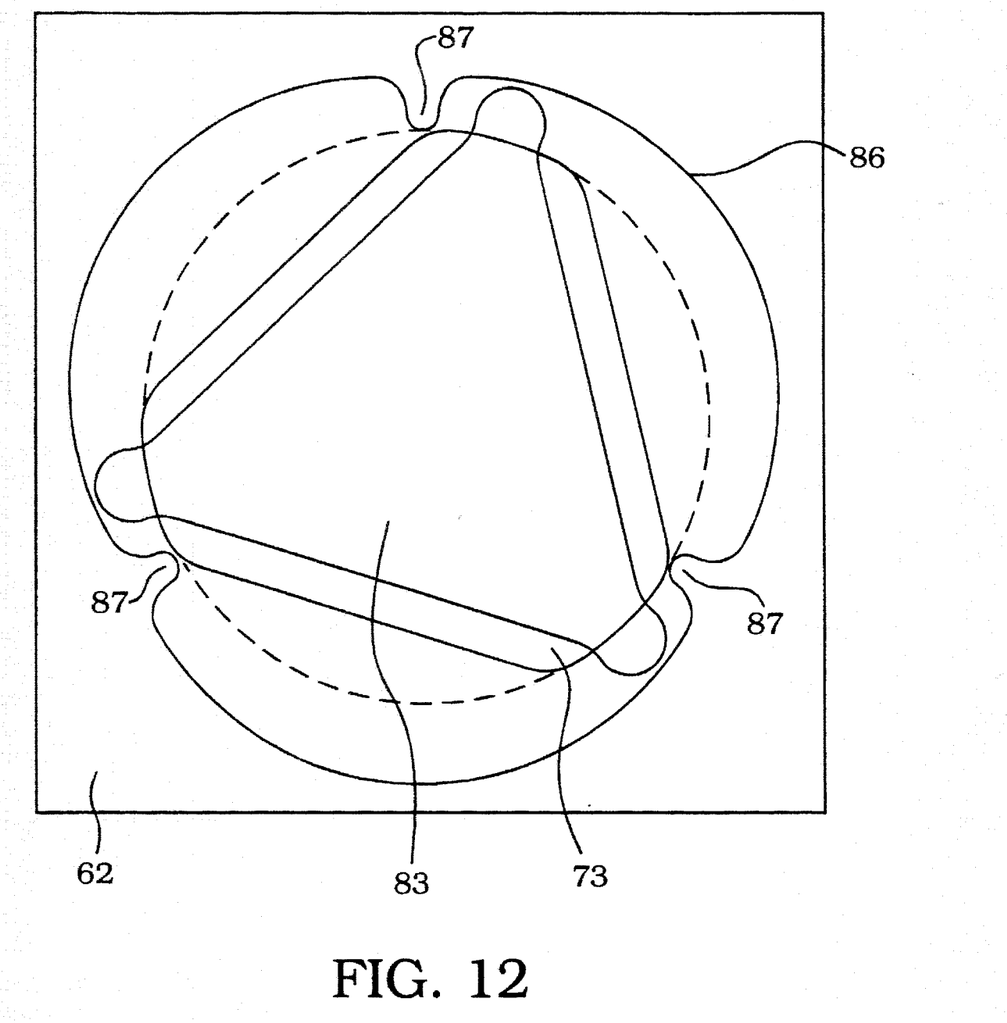
FIG. 12 shows an axial view of the peg and bracket of FIG. 11, with the peg slightly turned toward the locking position.
Figure 13:
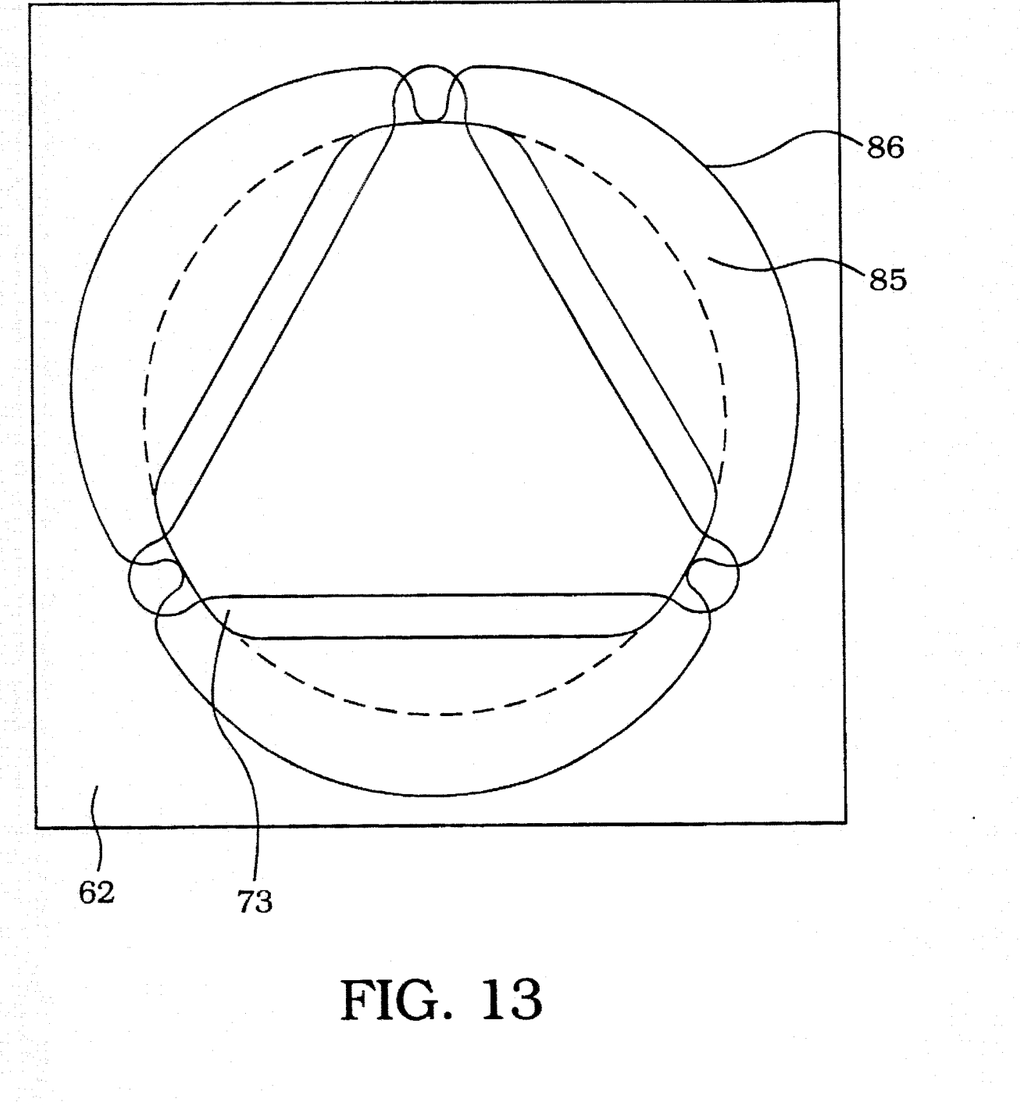
FIG. 13 shows an axial view of the peg and bracket of FIG. 11, with the peg arranged in the locking position.

Another embodiment is shown in FIGS. 11–13, wherein the hole 85 in the bracket 62 has large and small radius portions 86 and 87 similar to those discussed above in FIG. 10. One embodiment of the peg 73 (shown in broken lines) has a cross-sectional radius substantially equal to the radius of the small radius portions 86. As a result, the outer peripheral surface of the peg constantly abuts the edge of the bracket 62, at the small radius portions 86 of the bracket hole 85, when the triangular member 83 is passed through the hole 85. In another embodiment of the peg 73 (shown in solid lines), the cross-sectional shape is that of a circle truncated in three locations to form three equally spaced arc portions 95, each having a radius substantially equal to the radius of the small radius portions 86. The tips of the triangle defined by the triangular member 83 are centered relative to the arc portions 95. In FIGS. 11–13, the triangular member 83 defines a modified triangle, wherein the tips are extended to provide a more assured engagement with the bracket 62.

Various features described with respect to the embodiments shown in FIGS. 10–11 may be incorporated in the embodiment shown in FIGS. 5–7. The presently disclosed embodiments are to be considered in all respects as illustrative and not restrictive, the scope of the invention being indicated by the appended claims, rather than the foregoing description, and all changes which come within the meaning and range of equivalency of the claims are, therefore, intended to be embraced therein.

What is claimed is:

1. An apparatus for attaching a bicycle rider's shoe to a bicycle pedal mechanism having a pedal arm extending between a sprocket and a pedal axis, said apparatus comprising:

a peg having a first end and a second end;

a peg connector for connecting the first end of the peg to the shoe in a fixed position with respect to the shoe;

a bracket having a surface provided with an aperture therein, the aperture being shaped to receive the peg upon insertion of the peg downward through the aperture, the aperture having an edge which constantly abuts the peg upon the peg being received in the aperture;

a bracket connector for connecting the bracket to the pedal arm so as to substantially preclude upward vertical movement of the bracket with respect to the pedal axis; and attaching means, provided on the peg and spaced from the first end of the peg, for attaching the peg to the bracket upon inserting the peg in the aperture and turning the peg with respect to the bracket while the peg is connected to the shoe and while the bracket is connected to the pedal;

wherein the attaching means includes means for attaching the peg, at a particular riding position, to the bracket; and wherein the peg includes adjustment means for adjusting the particular riding position.

2. An apparatus as claimed in claim 1, wherein said adjustment means comprises:

a first body having a first surface, said first surface having a first array of ridges and grooves; and a second body having a second surface, said second surface having a second array of ridges and grooves, said second array being shaped to mesh with said first array.

3. An apparatus for attaching a bicycle rider's shoe to a bicycle pedal mechanism having a pedal arm extending between a sprocket and a pedal axis, said apparatus comprising:

a shoe member;

a shoe member support for supporting the shoe member on the bicycle rider's shoe;

a pedal arm member;

a pedal arm support member for supporting the pedal arm member on the pedal arm;

wherein one of the shoe member and the pedal arm member comprises an extended peg having a free end;

wherein the other of the shoe member and the pedal arm member comprises a bracket having a surface provided with an aperture therein, the aperture being shaped to receive the peg upon insertion of the peg through the aperture, the aperture having an edge which constantly abuts the peg upon the peg being received in the aperture, and a bracket connector for connecting the bracket to said other one of the shoe member and the pedal arm so as to substantially preclude upward vertical movement of the bracket with respect to said other one of the shoe member and pedal arm; and attaching means, provided on the peg, for attaching the peg to the bracket upon inserting the peg in the aperture and turning the peg and bracket with respect to each other while the peg is connected to one of the shoe and pedal arm and while the bracket is connected to the other of the shoe and the pedal arm;

wherein the attaching means includes means for attaching the peg, at a particular riding position, to the bracket.

4. an apparatus as claimed in claim 3, wherein the peg includes adjustment means for adjusting the particular riding position.

5. An apparatus for releasably attaching a bicycle rider's shoe to a bicycle pedal mechanism having a pedal arm extending between a sprocket and a pedal axis, said apparatus comprising:

a shoe member;

a shoe member support supporting the shoe member on the bicycle rider's shoe;

a pedal arm member;

a pedal arm support member supporting the pedal arm member on the pedal arm;

wherein one of the shoe member and the pedal arm member comprises an extended peg having a free end:

wherein the other of the shoe member and the pedal arm member comprises a bracket having a surface provided with an aperture therein, the aperture being shaped to receive the peg upon insertion of the peg through the aperture, the aperture having an edge which constantly abuts the peg upon the peg being received in the aperture, and a bracket connector connecting the bracket to said other one of the shoe member and the pedal arm so as to substantially preclude upward vertical movement of the bracket with respect to said other one of the shoe member and the pedal arm; and detaching means, provided on the peg, for detaching the peg from the bracket upon turning the peg and the bracket with respect to each other while the peg is received within the aperture and while the peg is connected to one of the shoe and the pedal arm, and while the bracket is connected to the other of the shoe and the pedal arm.

6. An apparatus for releasably attaching a bicycle rider's shoe to a bicycle pedal mechanism having a pedal arm extending between a sprocket and a pedal axis, said apparatus comprising:

a shoe member;

a shoe member support supporting the shoe member on the bicycle rider's shoe;

a pedal arm member;

a pedal arm support member supporting the pedal arm member on the pedal arm;

wherein one of the shoe member and the pedal arm member comprises an extended peg having a free end:

wherein the other of the shoe member and the pedal arm member comprises a bracket having a surface provided with an aperture therein, the aperture being shaped to receive the peg upon insertion of the peg through the aperture, the aperture having an edge which constantly abuts the peg upon the peg being received in the aperture, and a bracket connector connecting the bracket to said other one of the shoe member and the pedal arm so as to substantially preclude upward vertical movement of the bracket with respect to said other one of the shoe member and the pedal arm; and one of the peg and the bracket having tabs and the other of the peg and bracket having tab mating members for engaging the tabs upon the peg being received within the aperture, the tabs and tab mating members are arranged to disengage upon turning the peg and the bracket with respect to each other while the peg is received within the aperture and while the peg is connected to one of the shoe and the pedal arm, and while the bracket is connected to the other of the shoe and the pedal arm.

* * * * *